United States Patent
Lo et al.

(10) Patent No.: US 7,497,550 B2
(45) Date of Patent: *Mar. 3, 2009

(54) INK OVER-SPRAY CONTAINMENT APPARATUS AND METHOD

(75) Inventors: Kevin Lo, Vancouver, WA (US); Lynn Cheney, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 898 days.

This patent is subject to a terminal disclaimer.

(21) Appl. No.: 10/611,393

(22) Filed: Jun. 30, 2003

(65) Prior Publication Data

US 2006/0170976 A1    Aug. 3, 2006

(51) Int. Cl.
*B41J 2/165* (2006.01)
(52) U.S. Cl. ............................ 347/31; 347/35; 347/36
(58) Field of Classification Search .................. 347/22, 347/29, 30, 31, 36, 35; 442/392
See application file for complete search history.

(56) References Cited

U.S. PATENT DOCUMENTS

| | | | |
|---|---|---|---|
| 4,024,548 A * | 5/1977 | Alonso et al. | 347/34 |
| 6,273,555 B1 | 8/2001 | Hess | |
| 6,273,557 B1 | 8/2001 | Milligan et al. | |
| 6,371,596 B1 | 4/2002 | Maze et al. | |
| 6,527,370 B1 | 3/2003 | Courian et al. | |
| 6,534,247 B2 | 3/2003 | Milligan et al. | |
| 6,809,047 B2 * | 10/2004 | Lebold et al. | 442/392 |
| 6,860,583 B2 * | 3/2005 | Cheney et al. | 347/35 |

* cited by examiner

*Primary Examiner*—Shih-wen Hsieh (57) ABSTRACT

An ink over-spray containment apparatus includes a first member having a first fluidic transport coefficient and a first ink affinity; and a second member coupled to the first member. The second member has a second fluidic transport coefficient lesser than the first fluidic transport coefficient and a second ink affinity greater than the first ink affinity.

42 Claims, 4 Drawing Sheets

INK OVER-SPRAY CONTAINMENT APPARATUS AND METHOD

BACKGROUND

With a personal computer and an appropriate software package, a user can produce virtually any type of document that may be desired. For example, word processing software is used to produce text documents. Graphic design or computer-aided design software can be used to produce diagrams, charts, graphs, designs, etc. Spreadsheet software allows a user to manage large amounts of financial and other types of information. Database software similarly allows a user to manage various databases of information such as, client contact information, address and phone number information or "to do" items.

Frequently, it is desirable to generate a hardcopy of a document or data set that is produced or stored on a personal computer or server. A hardcopy may be desired, for example, for record keeping purposes or to share with another party. Consequently, a wide variety of printers and printing devices have been developed that can receive a print job from a host computer and produce a hardcopy of the document or data represented by that print job.

One example of a printing device is an inkjet printer. A typical inkjet has an array of precisely formed nozzles attached to a print head substrate. Behind each nozzle is an ink ejection chamber that receives liquid ink from a reservoir. Pressure is selectively created in the ejection chambers to drive a small amount of ink through the respective nozzles. The ink ejection may be driven by thermally, mechanically, electrically, magnetically, and/or piezo-electrically activated means. Activation of the nozzles takes place in response to a signal generated by a processor. Properly sequencing the activation of each nozzle in the array in response to signals corresponding to a print job causes characters and/or images to form as the print head is moved with respect to a print medium, such as a piece of paper.

Printing operations have been limited in that they have not printed images on the entire surface of the print medium. Instead, printing devices have formed an image that was surrounded by a 'border' or region that was unused or unprinted. Recent efforts have focused on 'borderless' printing. Borderless printing involves the capability of forming an image on the entire surface up to and including the edges.

However, as ink is applied near the edges of a print medium, droplets of ink may miss the print medium and land on the surfacing supporting the print medium or other parts of the interior of the printing device. This is referred to as an "over-spray." If this over-sprayed ink is allowed to remain on any surface supporting or in contact with the print medium, the over-sprayed ink may undesirably mark the edges or back side of the print medium during the printing operation. In addition, print media introduced for subsequent print operations may also be undesirably marked by the over-sprayed ink, regardless of whether the print operation was 'borderless' or not. As a result, some printing devices that attempt borderless printing make use of a system to wick away any over-sprayed ink from the surface of the support.

Some of these systems utilize a foam top layer and a felt bottom layer separated by a physical gap. The over-sprayed ink is adsorbed by the foam top layer where it is retained until the foam becomes sufficiently saturated to drip the accumulated over-sprayed ink onto the bottom felt layer for containment. However, while this ink remains in the foam, the ink may still come into contact with the print medium and undesirably mark the print medium. Accordingly, print speed may be limited by the saturation characteristics of the foam in an effort to avoid this possibility.

SUMMARY

An ink over-spray containment apparatus includes a first member having a first fluidic transport coefficient and a first ink affinity. A second member is coupled to the first member. The second member has a second fluidic transport coefficient that is lesser than the first fluidic transport coefficient and a second ink affinity that is greater than the first ink affinity.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

An ink over-spray containment apparatus includes a first member having a first fluidic transport coefficient and a first ink affinity. A second member is coupled to the first member. The second member has a second fluidic transport coefficient that is lesser than the first fluidic transport coefficient and a second ink affinity that is greater than the first ink affinity. As used herein and in the appended claims, the term "ink" shall refer broadly to any ink, toner, colorant or other ink ejected by a print head. In addition, as used herein and in the appended claims the term "printing device" shall refer broadly to any mechanism or device capable of forming images and/or text on a print medium. Further, fluidic transport coefficient shall refer broadly to a material's ability to move a fluid. In addition, ink affinity shall refer broadly to a material's tendency to adsorb ink.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
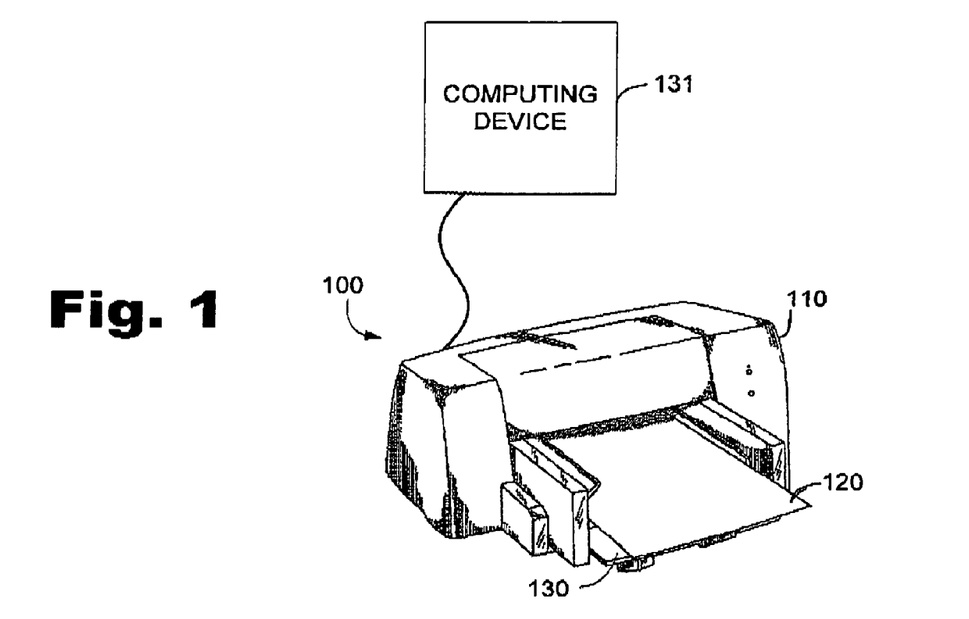
FIG. 1 illustrates a printing system that may be used to implement exemplary embodiments of the apparatus system and method.

FIG. 1 illustrates a printing device, such as an inkjet printer (100) configured to incorporate the present ink over-spray containment apparatus according to one exemplary embodiment. As shown in FIG. 1, an inkjet printer (100) includes housing (110) and a supply of print medium (120) disposed in or on the housing (110). The housing (110) of the inkjet printer (100) illustrated in FIG. 1 may be any shape or size sufficient to house an inkjet material dispenser and any associated hardware necessary to perform printing operations. The housing (110) may contain one or more material dispensers, print medium positioning rollers or belts, servo mechanisms, and/or computing devices.

The inkjet printer (100) may receive a print job from a communicatively coupled computing device (131), e.g., a host computer, wherein the print job includes a digital description of a desired image. The print job maybe converted into motion and dispensing commands that may then be used by the inkjet printer (100) to deposit ink on the print medium (120) to form the desired image. The inkjet printer (100) may be any inkjet capable of performing print-on-demand applications including, but in no way limited to, thermally activated inkjet material dispensers, mechanically activated inkjet material dispensers, electrically activated inkjet material dispensers, magnetically activated material dispensers, and/or piezo-electrically activated material dispensers.

In addition, the inkjet printer (100) is configured to perform borderless printing operations, i.e., to form an image and/or text over the entire surface of a print medium (120), including near and at the edges of the print medium. When a borderless image is formed on the print medium (120), ink may be sprayed onto the support (130), which supports the print medium (120), or on other surfaces interior to the housing (110) of the printing device (100). If this over-sprayed ink is allowed to remain on the surface of the support (130), the over-sprayed ink may undesirably mark the print medium, for example, the edges or back surface of the print medium. The support (130) therefore may include an over-spray containment system that contains the over-sprayed ink such that it does not undesirably mark the print medium. The configuration of the ink over-spray containment apparatus will be discussed in more detail below.

Figure 2:
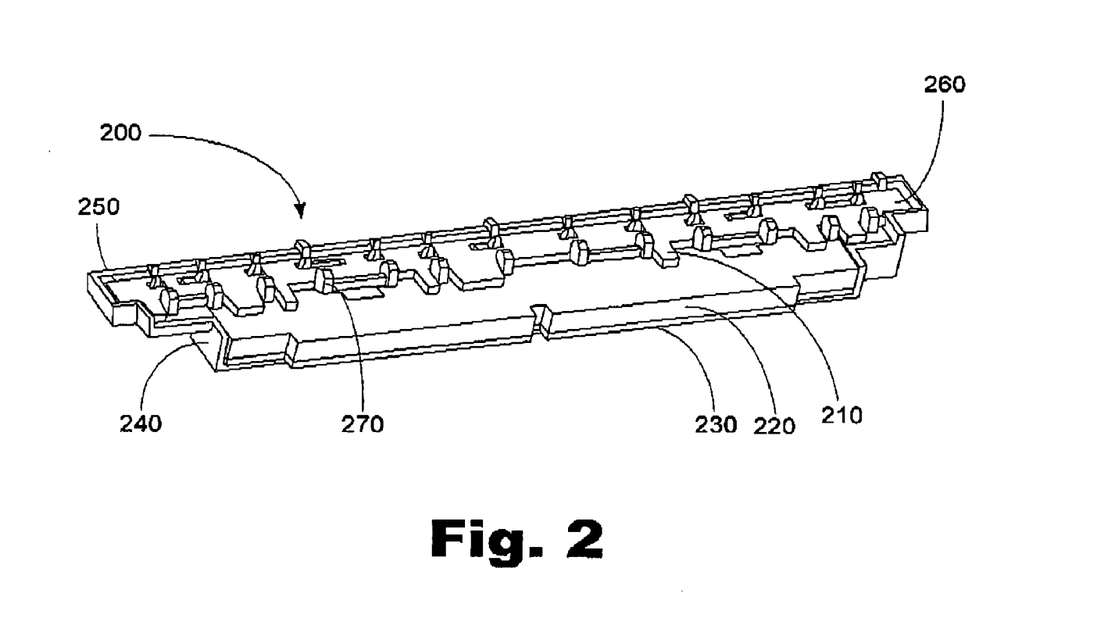
FIG. 2 illustrates an ink containment apparatus accordingly to one exemplary embodiment.

FIG. 2. illustrates a partial cross section of an ink over-spray containment apparatus (200). The ink over-spray containment apparatus (200) generally includes a first member (210), a second member (220), a third member (230), and a platen (240).

Over-sprayed ink is quickly drawn from the surface of the print medium support (130) into the first member (210). The first member then conveys the ink to the second member, where the ink is substantially contained. The third member (230) supports the second member (220). The third member may be formed with a compressible foam such that when compressed, the third member (230) applies force to the first and second members (210, 220), thereby increasing the contact surface area between them.

Platen (240) channels ink from the flank portions (250, 260) of the first member (210) and further contains any ink that may escape from the second and third members (220, 230) from further leaking into other parts of the printing device (100). In addition, the platen (240) includes print medium support ribs (270) that support the print medium (120) in a print zone (not shown) during a printing operation. The specific configuration of each of the layers will be discussed in more detail below.

Exemplary Implementation and Operation

Figure 3:
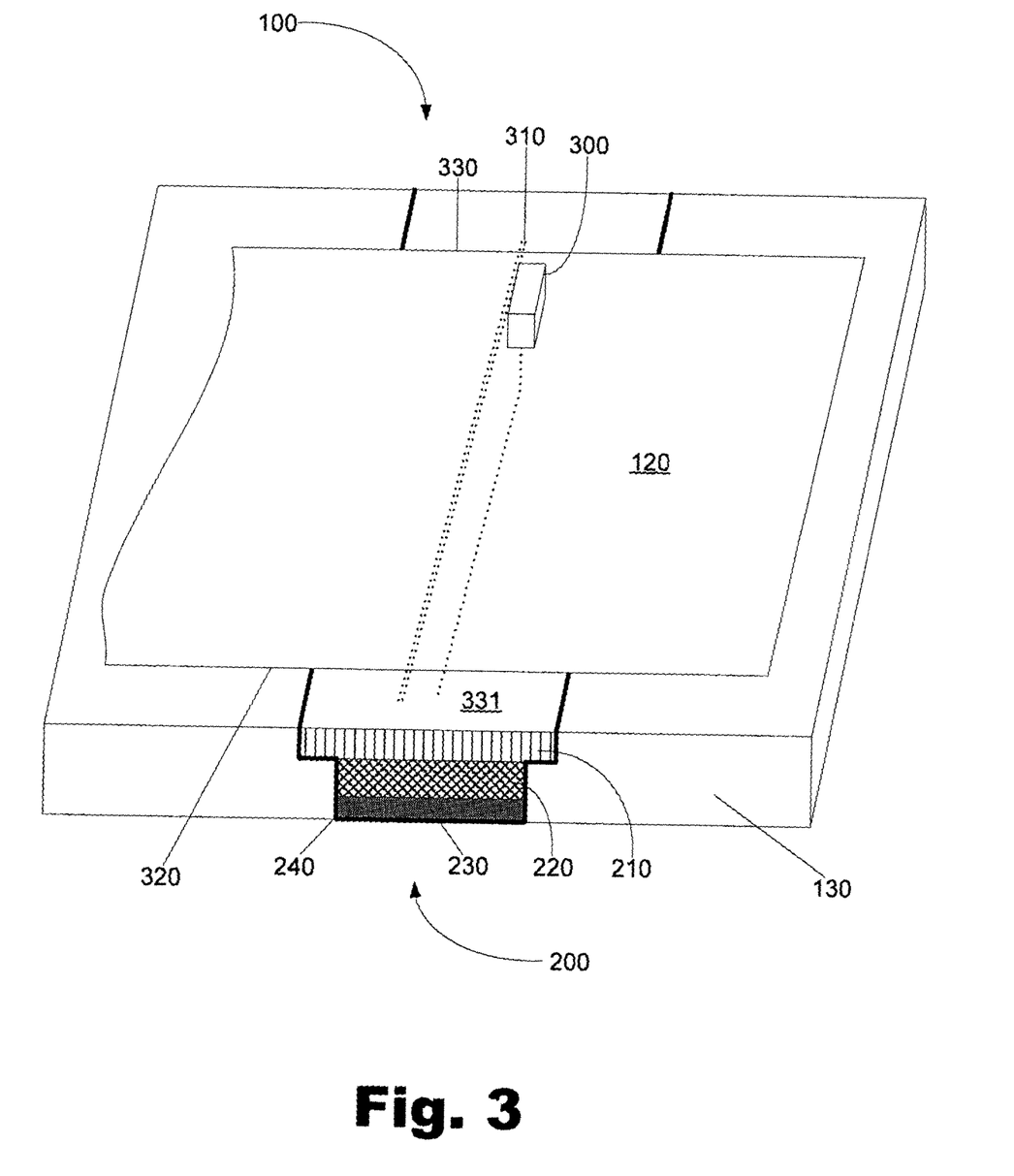
FIG. 3 illustrates a schematic view of a printing system according to one exemplary embodiment.

FIG. 3 illustrates a schematic view of an inkjet printer (100) that implements an ink over-spray containment apparatus (200). In operation, the print head (300) selectively ejects ink droplets (310) on the print medium (120), in response to the print job discussed above, in order to form text and/or images over the entire surface of the print medium (120). As the print head (300) nears the edges (320, 330) of the print medium (120), some ink droplets (310) may be over-sprayed onto the surface (331) of the first member (210) of the ink over-spray containment apparatus (200). The ink containment apparatus (200) quickly adsorbs the ink droplets (310), thereby preventing the over-sprayed ink from undesirably marking the print medium (120).

The first member (210) has an affinity for ink. This ink affinity creates a capillary head within the first member that draws the ink into the first member (210). In addition, the first member has a relatively high fluidic transport coefficient, such that after adsorbing the ink, the first member (210) readily conveys the ink. Accordingly, the first member draws the over-sprayed ink away from the surface (331), and then conveys the over-sprayed ink to the second member (220) that is disposed below the first member (210).

The second member (220) has a slightly higher affinity for ink while having a lower fluidic transport coefficient than the first member (210). This higher ink affinity causes a higher capillary head which, in addition to the high fluidic transfer coefficient of the first member (210), causes the ink to move from the first member (210) to the second member (220). Further, the low fluidic transport coefficient of the second member (220) prevents the ink from migrating back to the first member (210) once the ink has been transferred to the second member. Accordingly, the ink transferred from the first member (210) is retained in the second member (220). Further, the ink is prevented from migrating to the third member (230) that is disposed below the second member (220).

The third member (230) has a lower ink affinity and a similar or lower fluidic transport coefficient than that of the second member (220). In addition, the higher relative ink affinity of the second member causes ink contained in the third member (230) to be drawn to and contained within the second member (220). Consequently, over-sprayed ink is drawn to and collected in the second member (220) and is thereby kept away from the print medium (120) and the other internal parts of the printing device where such ink may cause damage or undesirably mark the print medium (120).

The first member (210), second member (220), and third member (230) are located within the platen (240). The platen (240) is a liquid-tight vessel that prevents ink that may seep from the first, second or third members (210, 220, 230) from seeping into other parts of the printing device (100) or to areas outside the printer (100). In addition, the platen is open on the first member side (210) such that a surface of the first member (210) is exposed to over-sprayed ink. The third member (230) is located in the bottom of the platen (240), with the second member (220) and the first member (210) located in succession in the platen (240) on top of the third member (230).

In the illustrated implementation, the third member (230) is compressibly coupled to the first and second members (210, 220). This compression increases the amount of surface area contact between the first and second members (210, 220), thereby improving fluid flow from the first member (210) to the second member (220) due to the relative differences in the capillary head and fluidic transport coefficients.

Thus, the ink over-spray containment apparatus (200) is configured to quickly remove over-sprayed ink from a surface and convey the ink to, and substantially contain it within, the second member (220). Accordingly, the ink over-spray containment apparatus minimizes the amount of over-sprayed ink that undesirably marks a print medium while containing the ink and preventing the ink from leaking into the rest of the printer.

In addition, the configuration of the ink over-spray containment apparatus (200) may enable full-page printing applications to be developed for larger print mediums because the ink over-spray containment apparatus disclosed herein utilizes relatively cost efficient materials. Cost may be at least partially dependent on the ink-affinity of the materials used. In the illustrated implementation the amount of materials with high ink affinity is minimized. The ink affinity of the first member (210) may be minimized by utilizing a material that has a relatively large fluidic transport coefficient. Further, the required ink affinity of the second member may be minimized by utilizing a first member (210) that includes a material with a high fluidic transport coefficient because the first member (210) readily conveys ink to the second member between the second member (220). Additionally, if the ink affinity of the first member (210) is minimized, the ink affinity required of the second member (220) is also minimized. The second member (220) need only have an ink affinity sufficiently higher than the ink affinity of the first member (210) to readily draw ink from the first member (210) into the second member (220) due to the high fluidic transport of the first member (210). Thus, if the ink affinity of the first member (210) is relatively low, the ink affinity of the second member (220) need only be slightly higher.

Figure 4:
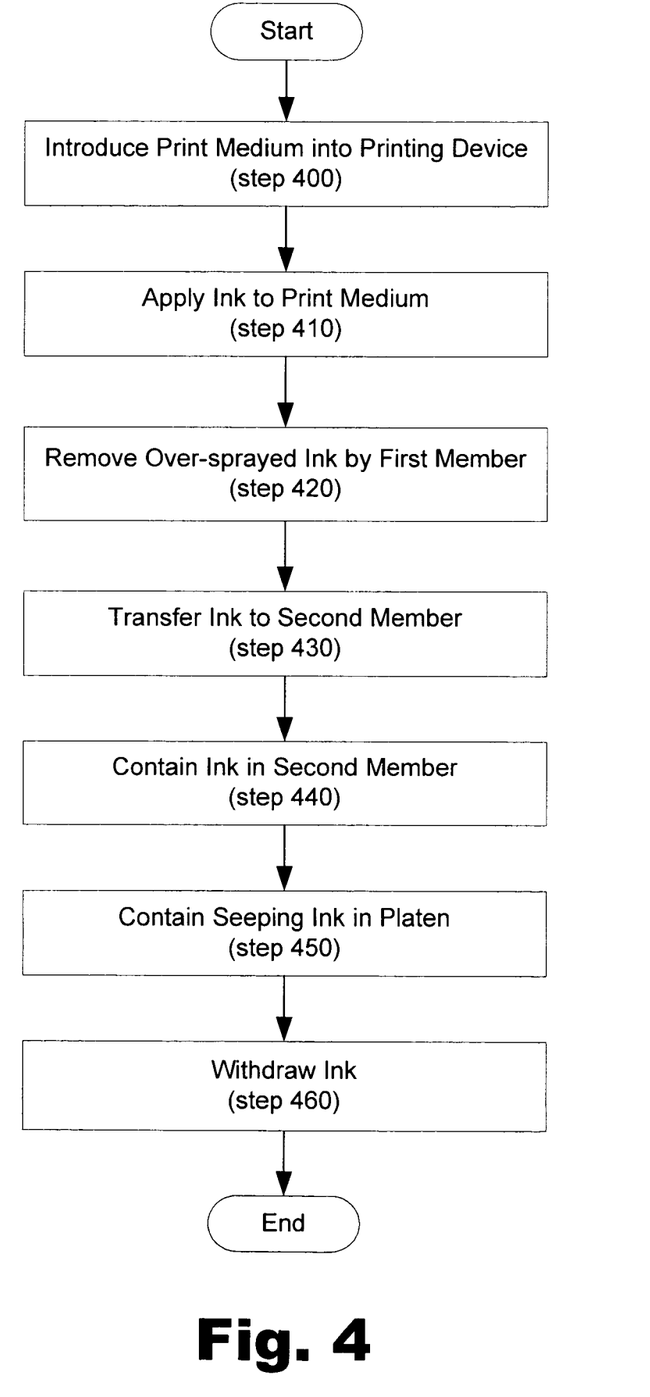
FIG. 4 is a flowchart illustrating a method of using an ink over-spray containment apparatus according to an exemplary embodiment.

FIG. 4 is a flowchart illustrating a method of using the present apparatus. The method begins by introducing a print medium into a printing device (step 400). An ink is then applied to the print medium (step 410). The printing device may be configured to apply the ink to the entire surface of the print medium, including the edges, in order to form a borderless image.

As the ink is applied to and near the edges of print medium, some of the ink may be sprayed onto the surface supporting the print medium or other components within the printing device. If this over-sprayed ink is allowed to remain on the surface supporting the print medium, the over-sprayed ink may undesirably mark the print medium. Accordingly, the over-sprayed ink is removed from the surface supporting the print medium (step 420) by a first or top member of an ink-over-spray containment apparatus.

The first member has an affinity for the ink such that when the ink is sprayed onto the first member a capillary head is generated. The first member also has a high fluidic transport coefficient such that the ink is quickly transferred through the first member to a second member (step 430) that is coupled to or in contact with the first member.

The second member has a higher affinity for the ink than the first member, thereby generating a higher capillary head. While the second member has a higher capillary head than the first member, the second member has a lower fluidic transport coefficient than the first member. Thus, the ink is prevented from migrating back to the first member. Accordingly, the seeping ink is contained within the second member (step 440).

A third member is also coupled to the second member. The third member has a lower affinity for the ink and a low fluidic transport coefficient. Due to these characteristics, ink that seeps into the third member is conveyed to and contained by the second member. The ink is further contained and prevented from leaking to the rest of the printer by a platen (step 450) that sealingly supports the first, second, and third members.

At some point, the second member will become saturated with ink. At that point, the ink may be removed from the ink over-spray containment apparatus (step 460). This may be done by removing the over-spray containment apparatus from the printing device and either disassembling the ink over-spray apparatus to remove the second member for cleaning or replacement, or by replacing the entire over-spray containment apparatus with a new one.

Figure 5:
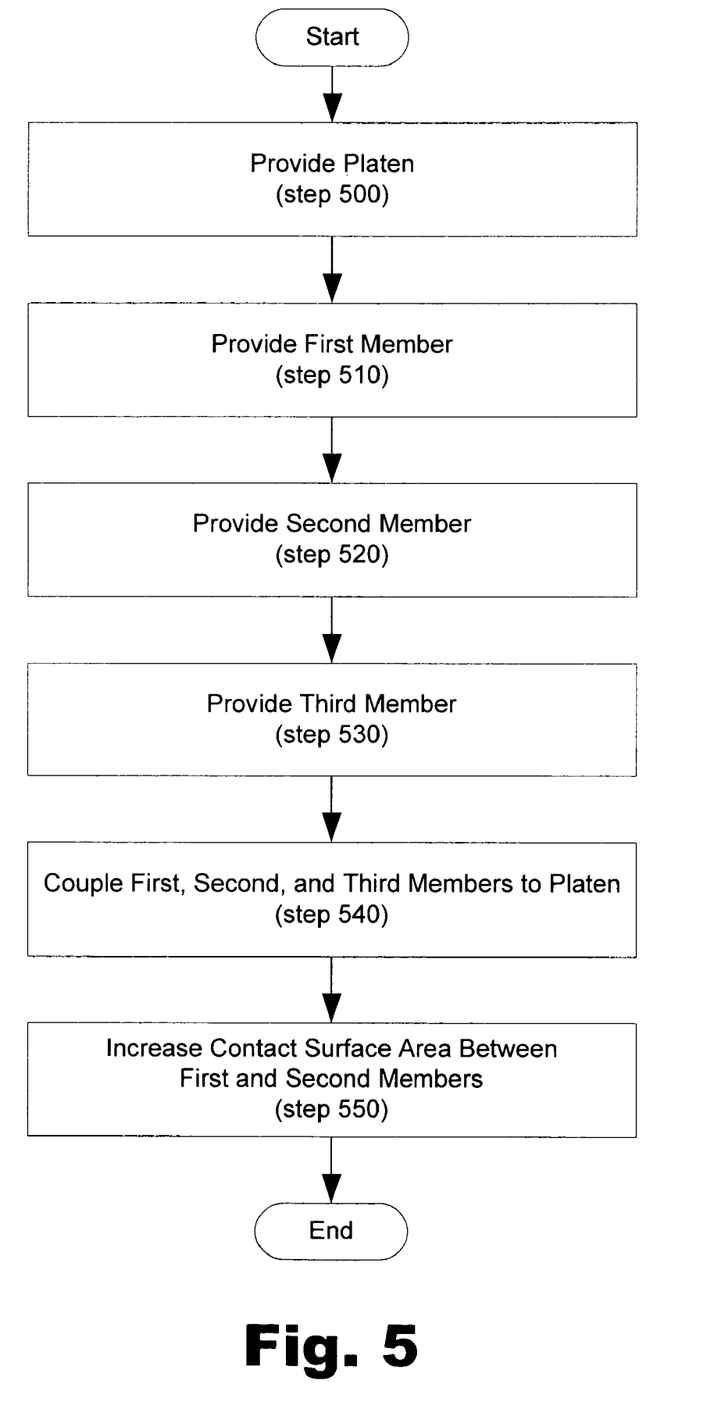
FIG. 5 is a flowchart illustrating a method of forming an ink over-spray containment apparatus according to an exemplary embodiment.

FIG. 5 is a flowchart illustrating a method of forming the ink containment apparatus. The process begins by providing a platen (step 500). The platen includes ribs or print medium support ribs that extend from the bottom of the platen to the top surface. In addition, the platen includes a generally concave liquid-tight vessel. Suitable materials for the platen may include, but are in no way limited to, structural materials such as plastics or metals.

Next, a first member is provided (step 510). The first member has an affinity for the type of ink to be applied to a print medium while having a high fluidic transport coefficient. Examples of such materials may include, but are in no way limited to, porous plastics.

Next, a second member is provided (step 520) that has a higher ink affinity and lower fluidic transport coefficient than the first member. Examples of such materials may include, but are in no way limited to, needle felts.

A third member is then provided (step 530). The third member has a lower ink affinity than the second member. The third member also has a relatively low fluidic transport coefficient. Examples of such materials may include, but are in no way limited to, compressible foams such as those commonly used in ink cartridges.

The three members are then coupled to the platen (step 540) and are stacked on each other in the platen so as to be in physical contact. This allows the movement and collection of ink in the second member.

In addition, it may be desirable to increase the contact surface area between the first and second members (step 550). This may be accomplished by compressing the third member. In response to this compressible coupling, the third member applies a force to the first and second members, thereby increasing the contact surface area between those members. Accordingly, the present method allows for formation of an ink over-spray containment apparatus that quickly removes and over-sprayed ink, thereby facilitating formation of borderless images while minimizing the undesired marking of the print medium.

Alternative Embodiments

In the illustrated implementation, the printing device is a scanning inkjet printer. In other implementations, not shown, the ink over-spray containment apparatus is utilized in page-wide array inkjet printers, plotters, and other printing devices. Further, those of skill in the art will appreciate that any number of members may be used in forming ink over-spray containment apparatuses.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the invention be defined by the following claims.

What is claimed is:

1. An ink over-spray containment apparatus, comprising:
a first member having a first fluidic transport coefficient and a first ink affinity;
a second member coupled to said first member, said second member having a second fluidic transport coefficient lesser than said first fluidic transport coefficient and a second ink affinity greater than said first ink affinity; wherein said first member comprises porous plastic.

2. The apparatus of claim 1, wherein said second member comprises needle felt.

3. The apparatus of claim 1, wherein a platen containing said first and second members is further configured to channel ink from flank portions of said first member to said second member.

4. An ink over-spray containment apparatus, comprising:
a first member having a first fluidic transport coefficient and a first ink affinity;
a second member coupled to said first member, said second member having a second fluidic transport coefficient lesser than said first fluidic transport coefficient and a second ink affinity greater than said first ink affinity; and
a third member coupled to said second member, said third member having a third fluidic transport coefficient lesser than said second fluidic transport coefficient and a third ink affinity lesser than said second ink affinity.

5. The apparatus of claim 4, wherein said third member comprises a compressible material.

6. The apparatus of claim 5, wherein said compressible material comprises compressible foam.

7. The apparatus of claim 5, wherein said third member is compressibly coupled to said second member.

8. The apparatus of claim 4, wherein said first, second, and third members are supportingly disposed within a platen.

9. The apparatus of claim 8, wherein said platen sealingly supports said first, second, and third members.

10. The apparatus of claim 8, wherein said platen comprises print medium support ribs.

11. An ink over-spray containment apparatus, comprising:
a first member having a first fluidic transport coefficient and a first ink affinity;
a second member coupled to said first member having a second fluidic transport coefficient less than said first fluidic transport coefficient and a second ink affinity greater than said first ink affinity; and
a third member coupled to said second member, said third member having a third fluidic transport coefficient lesser than said second fluidic transport coefficient and a third ink affinity less than said second ink affinity.

12. The apparatus of claim 11, wherein said first member comprises porous plastic.

13. The apparatus of claim 11, wherein said second member comprises needle felt.

14. The apparatus of claim 11, wherein said third member comprises a compressible material.

15. The apparatus of claim 14, wherein said compressible material comprises compressible foam.

16. The apparatus of claim 14, wherein said third member is compressibly coupled to said second member.

17. The apparatus of claim 11, wherein said first, second, and third members are supportingly disposed within a platen.

18. The apparatus of claim 17, wherein said platen comprises a liquid tight vessel and sealingly supports said first second, and third members.

19. The apparatus of claim 18, wherein said platen comprises print medium support ribs.

20. A printing device, comprising:
means for printing; and
a print medium support, said print medium support including an ink over-spray containment apparatus having;
a first member having a first fluidic transport coefficient and a first ink affinity;
a second member coupled to said first member having a second fluidic transport coefficient less than said first fluidic transport coefficient and a second ink affinity greater than said first ink affinity; and
a third member coupled to said second member, said third member having a third fluidic transport coefficient lesser than said second fluidic transport coefficient and a third ink affinity less than said second ink affinity.

21. The apparatus of claim 20, wherein said first member comprises porous plastic.

22. The apparatus of claim 20, wherein said second member comprises needle felt.

23. The apparatus of claim 20, wherein said third member comprises a compressible material.

24. The apparatus of claim 23, wherein said compressible material comprises compressible foam.

25. The apparatus of claim 23, wherein said third member is compressibly coupled to said second member.

26. The apparatus of claim 20, wherein said first, second, and third members are supportingly disposed within a platen.

27. The apparatus of claim 26, wherein said platen comprises a liquid tight vessel and sealingly supports said first, second, and third members.

28. The apparatus of claim 27, wherein said platen comprises print medium support ribs.

29. A method of containing fluid over-spray, comprising:
providing a platen to support print media moving trough a printing device;
providing a first member having a first ink affinity, a first fluidic transport coefficient and a sprayed surface;
providing a second member having an ink affinity greater than said first ink affinity and a fluidic transport coefficient lesser than said first fluidic transport;
transporting an ink from said sprayed surface to said second member; and
disposing said first and second members within said platen to contain a seepage of said ink from said first and second members.

30. The method of claim 29, further comprising containing said ink within said second member.

31. The method of claim 30, further comprising preventing said ink from migrating back to said first member.

32. A method of containing fluid over-spray, comprising:
providing a first member having a first ink affinity, a first fluidic transport coefficient and a sprayed surface;
providing a second member having an ink affinity greater than said first ink affinity and a fluidic transport coefficient lesser than said first fluidic transport;
transporting an ink from said sprayed surface to said second member; and
providing a third member adjacent to said second member, said third member having a lower fluid affinity and lower fluidic transport coefficient than said second member.

33. The method of claim 32, further comprising transporting said ink from said third member to said second member.

34. The method of claim 32, further comprising increasing a contact surface area between said first and second members.

35. The method of claim 32, and further comprising disposing said first, second, and third members within a platen to contain a seepage of said ink from said first, second, and third members.

36. A method of forming an ink over-spray containment apparatus, comprising:
providing a first member having a first ink affinity and a first fluidic transport coefficient;

providing a second member having a second ink affinity higher than said first ink affinity and a fluidic transport coefficient lower than said first fluidic transport coefficient; and providing a platen tat supports print media moving through a printing device, contains said first and second members and contains any ink that may escape from either the first or second member.

37. A method of forming an ink over-spray containment apparatus, comprising:

providing a first member having a first ink affinity and a first fluidic transport coefficient;

providing a second member having a second ink affinity higher than said first ink affinity and a fluidic transport coefficient lower than said first fluidic transport coefficient; and providing a third member in contact with said second member, said third member having a lower fluid affinity and lower fluidic transport coefficient than said second member.

38. The method of claim 37, further comprising providing a platen and coupling said first, second, and third members to said platen.

39. The method of claim 38, wherein said platen comprises print medium support ribs.

40. The method of claim 37, wherein said platen comprises a liquid-tight vessel.

41. An ink over-spray containment system, comprising:

ink transport means for transporting ink away from a sprayed surface having an ink affinity and a fluidic transport coefficient;

ink containment means for containing said ink, said ink containment means having greater ink affinity and lesser fluidic transport characteristics than said ink transport means; and a compressed member coupled to said ink transport means or said ink containment means for actively applying a force to said ink transport means and said ink containment means to increase a contact surface area between said ink transport means and said ink containment means.

42. The system of claim 41, further comprising means for sealingly supporting said ink transport means, said ink containment means, and said compression means.

\* \* \* \* \*

UNITED STATES PATENT AND TRADEMARK OFFICE
CERTIFICATE OF CORRECTION

PATENT NO.         : 7,497,550 B2
APPLICATION NO. : 10/611393
DATED              : March 3, 2009
INVENTOR(S)        : Kevin Lo et al.

It is certified that error appears in the above-identified patent and that said Letters Patent is hereby corrected as shown below:

In column 7, line 58, in Claim 18, delete "first" and insert -- first, --, therefor.

In column 8, line 23, in Claim 27, delete "fight" and insert -- tight --, therefor.

In column 8, line 28, in Claim 29, delete "trough" and insert -- through --, therefor.

In column 9, line 5, in Claim 36, delete "tat" and insert -- that --, therefor.

Signed and Sealed this

Twenty-fourth Day of November, 2009

David J. Kappos
*Director of the United States Patent and Trademark Office*